April 23, 1957 K. E. RHODES 2,789,762

DUAL ENTRY CONTROLLING MEANS FOR ACCUMULATORS

Filed Jan. 20, 1954 5 Sheets-Sheet 1

*INVENTOR.*
KENNETH E. RHODES

BY G. R. Gugger
AGENT

April 23, 1957 K. E. RHODES 2,789,762

DUAL ENTRY CONTROLLING MEANS FOR ACCUMULATORS

Filed Jan. 20, 1954 5 Sheets-Sheet 2

INVENTOR.
KENNETH E. RHODES

BY

G. R. Gugger
AGENT

INVENTOR
KENNETH E. RHODES
BY G. R. Gugger
AGENT

April 23, 1957 K. E. RHODES 2,789,762

DUAL ENTRY CONTROLLING MEANS FOR ACCUMULATORS

Filed Jan. 20, 1954 5 Sheets-Sheet 4

INVENTOR.
KENNETH E. RHODES

BY

G. R. Gugger
AGENT

April 23, 1957 K. E. RHODES 2,789,762
DUAL ENTRY CONTROLLING MEANS FOR ACCUMULATORS
Filed Jan. 20, 1954 5 Sheets-Sheet 5
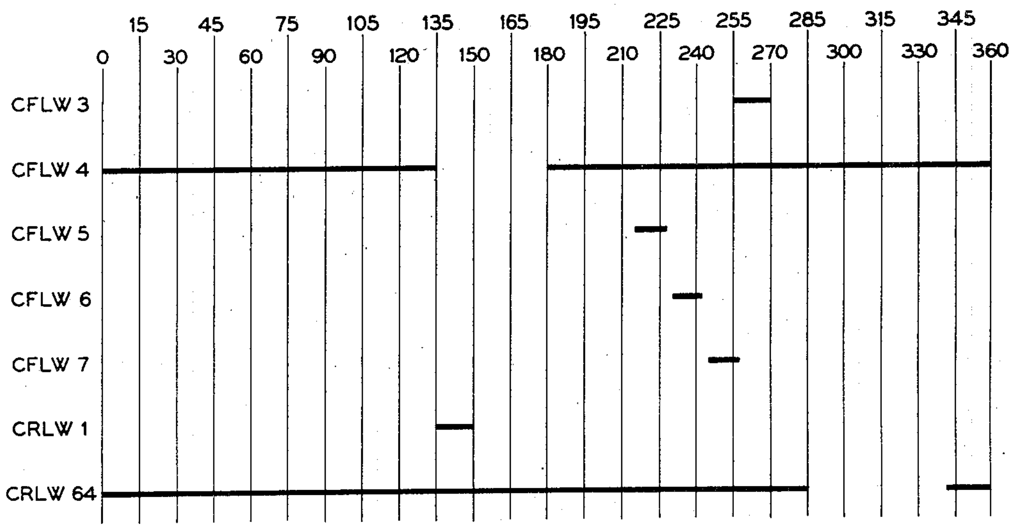
FIG. 3.
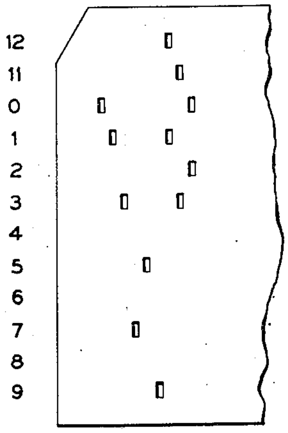
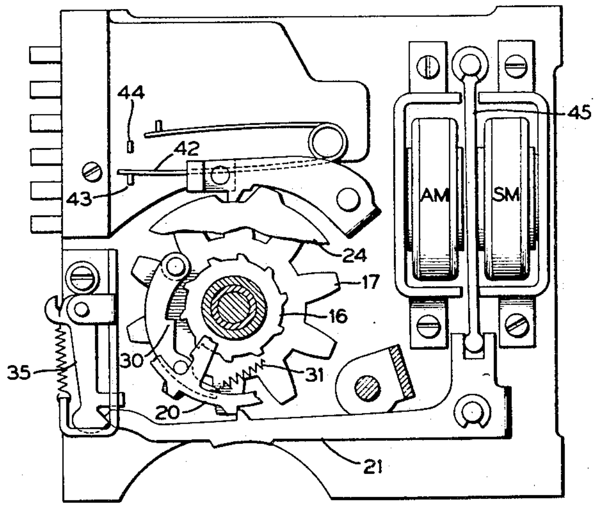
FIG. 4. FIG. 5.
INVENTOR.
KENNETH E. RHODES
BY
G. R. Gugger
AGENT 2,789,762

DUAL ENTRY CONTROLLING MEANS FOR ACCUMULATORS

Kenneth E. Rhodes, Vestal, N. Y., assignor to International Business Machines Corporation, New York, N. Y., a corporation of New York Application January 20, 1954, Serial No. 405,110

6 Claims. (Cl. 235—61.6)

Figure 1A:
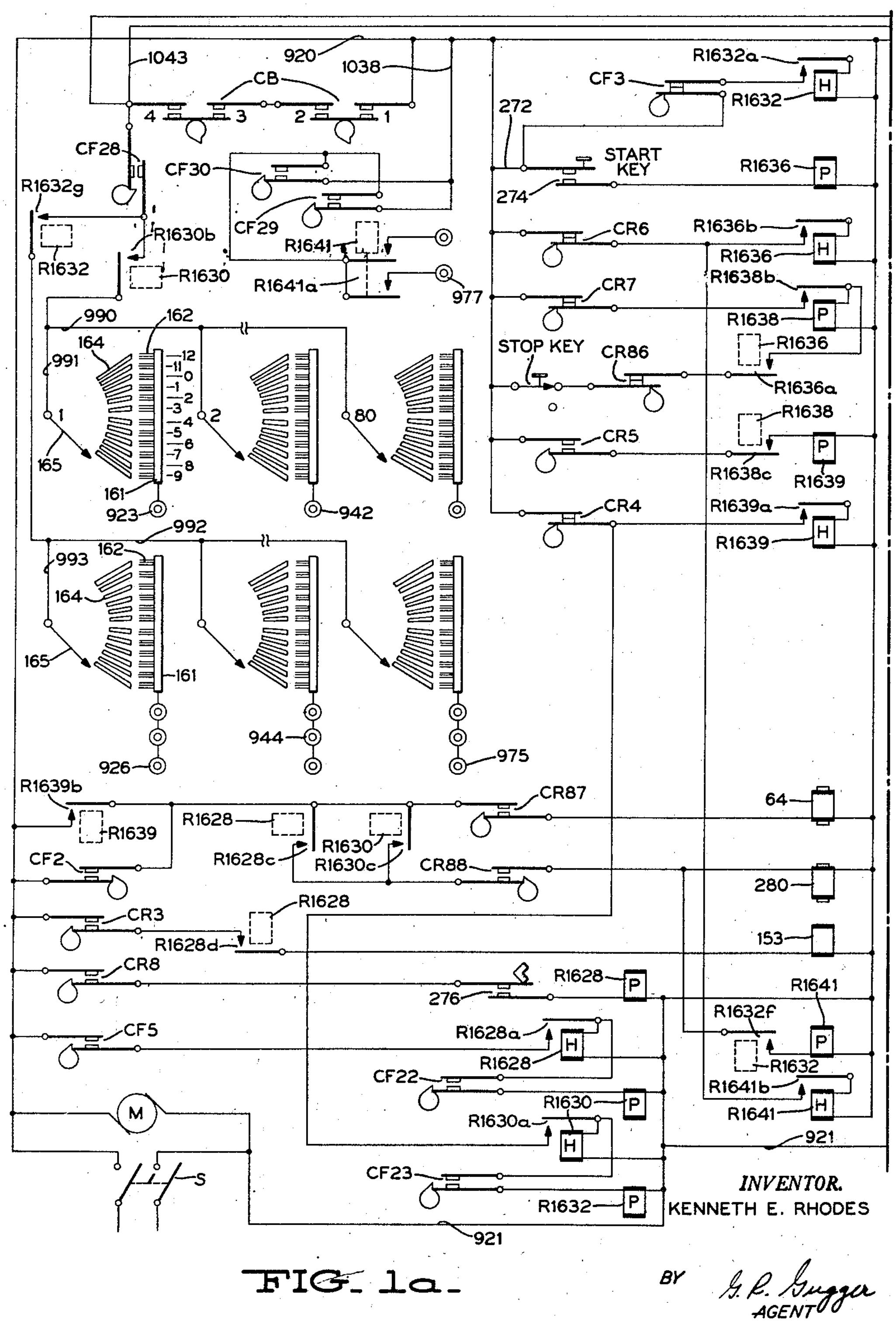

This invention relates to record controlled accounting machines and more particularly to improvements in the entering mechanisms for accumulators.

The present improvement was devised primarily to provide a more useful form of entering mechanism for an accumulator operable according to the decimal notation system under control of a card perforated according to the decimal notation system.

The prior art is replete with various forms of entering mechanisms for accumulators operable according to the decimal notation system in which the control element therefor, such as a card, keys, etc., is indexed in the same system. The indexing of the card in the same system is best exemplified in the IBM card. As is well known, the code used in the IBM card is the twelve hole code wherein the digit perforations 1 to 9 are differentiated further by 0, 11 and 12 perforations. The 0, 11 and 12 perforations are called zone perforations and are used in combination with the digit representations to form code combinations representing the twenty-six letters of the alphabet as well as special signs. Various forms of accumulators operable according to the decimal notation system are currently being used in record controlled accounting machines for storing data represented by the twelve hole code. However, these accumulators are capable of receiving and storing only the digit perforations 1–9 of the code and should it be desired to store the 0, 11 and 12 zone perforations, auxiliary storage devices must be provided which add considerably to the expense and complexity of the accounting machines. With the ever increasing need for additional storage capacity in accounting machine applications, it has become extremely desirable to increase the flexibility and capacity of the accumulators presently in the accounting machine without adding additional units or without affecting the normal operation of the machine.

It is, therefor, the main object of the present invention to provide an accumulator entry means under control of coded designations which is practical in construction and operation and which possesses features of flexibility which render the accumulator more useful in card controlled accounting machines.

Another object of the invention is to provide an entering means under control of digit representations and zone representations and operable during varying periods to enter either the digit or zone representations into an accumulator operable according to the decimal notation system.

A further object of the invention is to provide an entry mechanism as in the preceding object with means for selectively conditioning the mechanism to enter either digit representations or zone representations into an accumulator.

The accumulator preferably employed in connection with the present invention is of a type well known in the art wherein the initiation of a digit entering operation is effected by transmission of a start impulse to a start or advance electromagnet which couples the accumulator element to a driving shaft and wherein the entry operation for the accumulator element may be terminated by transmitting an impulse to a stop electromagnet which has the designated function. Accordingly, in the adoption of this form of accumulator with the present invention the digit entry is initiated and terminated in operation by impulses transmitted to the respective start and stop magnets. For additive operations the start magnet receives impulses under control of the card perforation analyzing means at predetermined times in the entering cycle of operation. The impulse transmitting means associated with the stop magnet is effective after transmission of each start impulse to transmit an impulse to the stop magnet to terminate the digit entering operation. By the provision of a relay switch in the entry circuit to the accumulator and suitably timed impulses for controlling the time of operation of the entry circuit, the accumulator start magnet may be made receptive to either the digit impulses or the zone impulses from the card. Suitable timing pulses are provided for controlling the stop magnet and relay means for connecting the timing pulses to the stop magnet. The time relationship between the three possible zone pulses from the card and the timed stop pulses results in representing a 0 by storing a 7, an 11 by a 6, and a 12 by a 5. At carry time the accumulator advances one step making the final relationship 0–8, 11–7 and 12–6. The relay switch may be selectively controlled to use the accumulator as desired either for normal digit entry or for zone entry without altering the normal operation of the accounting machine. The above construction carries out the objects of the invention in a manner which is distinguished by its flexibility and effectiveness in operation.

Other objects of the invention will be pointed out in the following description and claims and illustrated in the accompanying drawings, which disclose, by way of example, the principle of the invention and the best mode, which has been contemplated, of applying that principle.

Figure 1B:
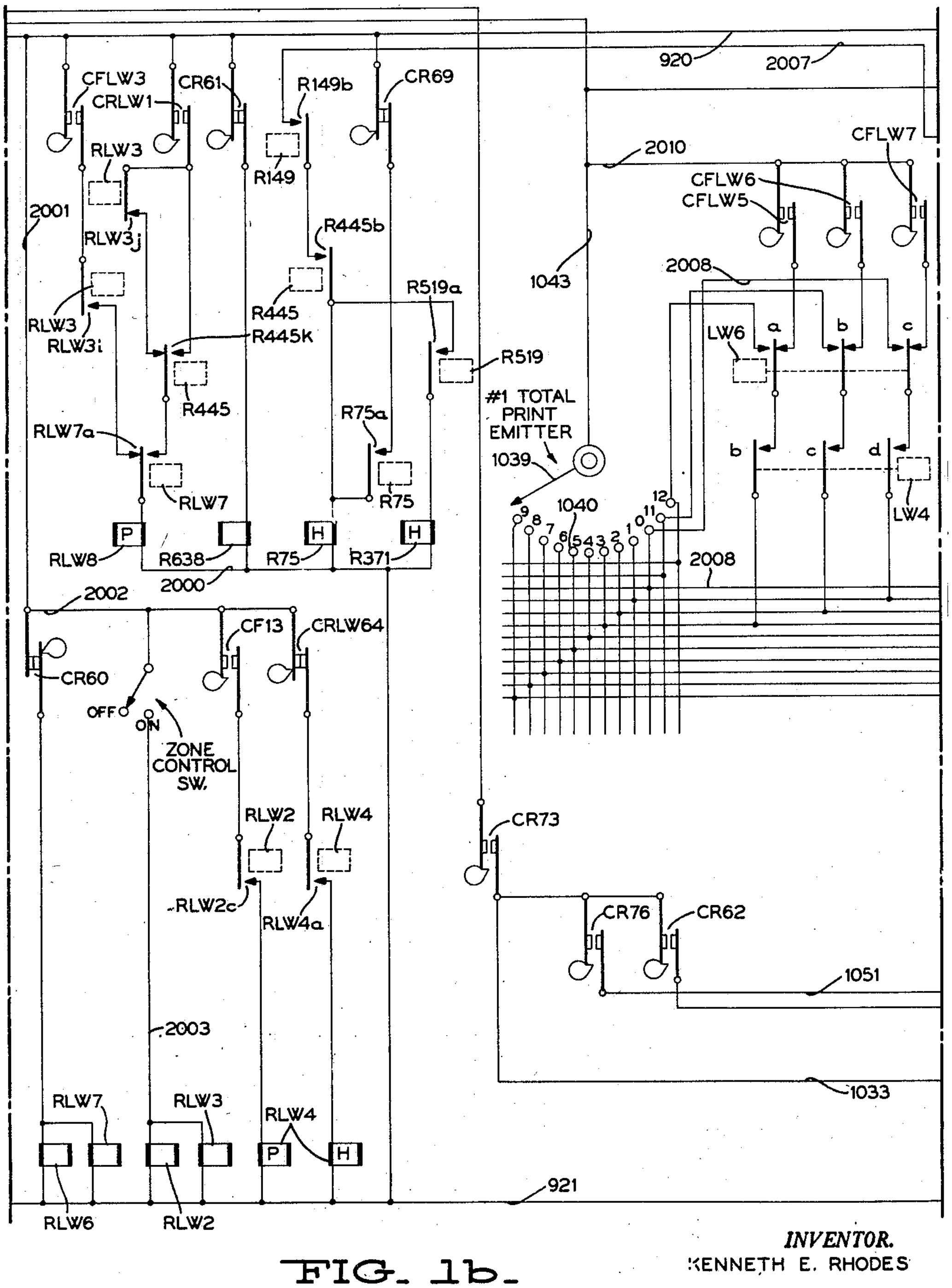
Figure 1C:
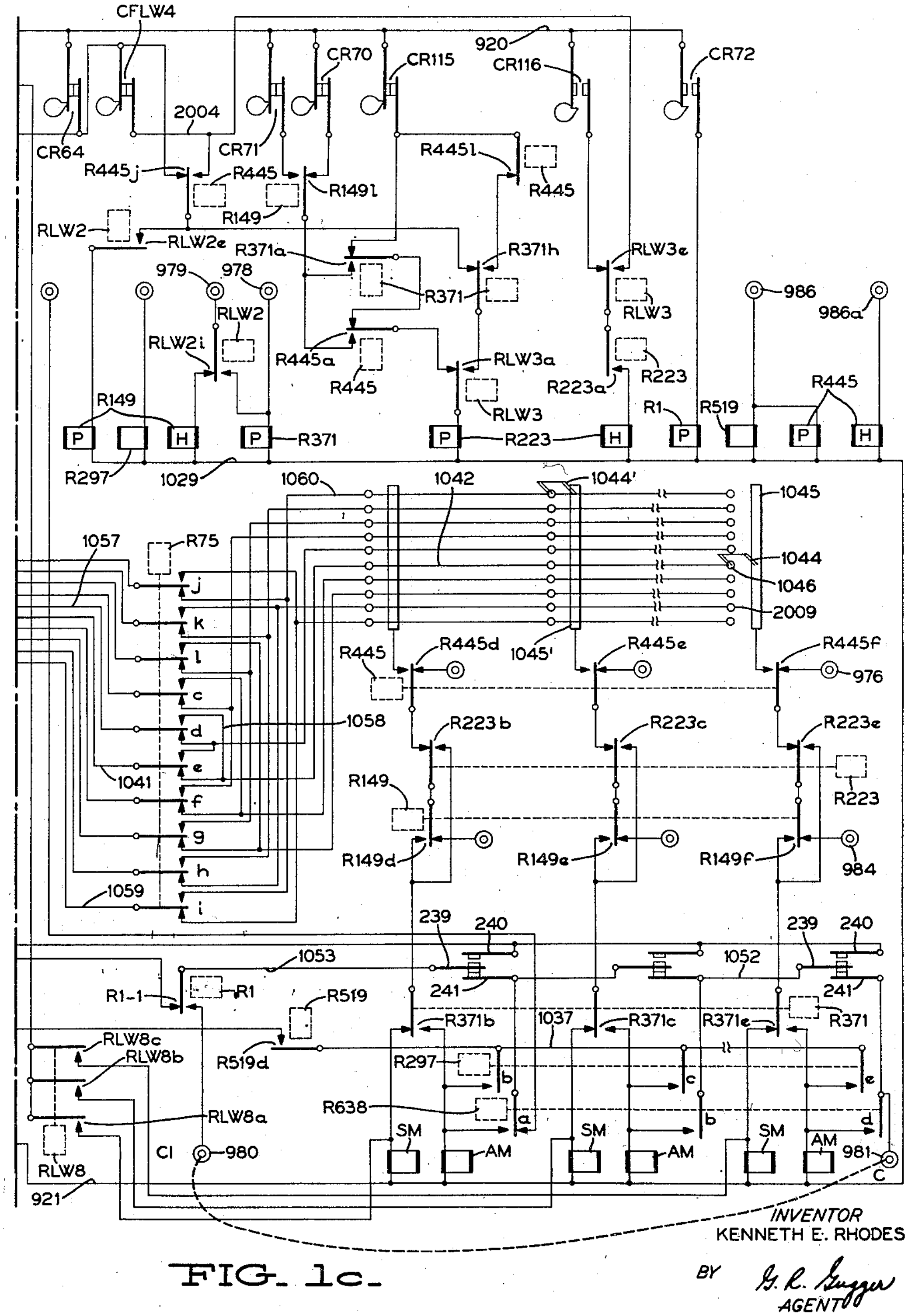

In the drawings:

Figs. 1*a*–1*c* comprise a diagram of the electrical wiring connections.

Figure 2:
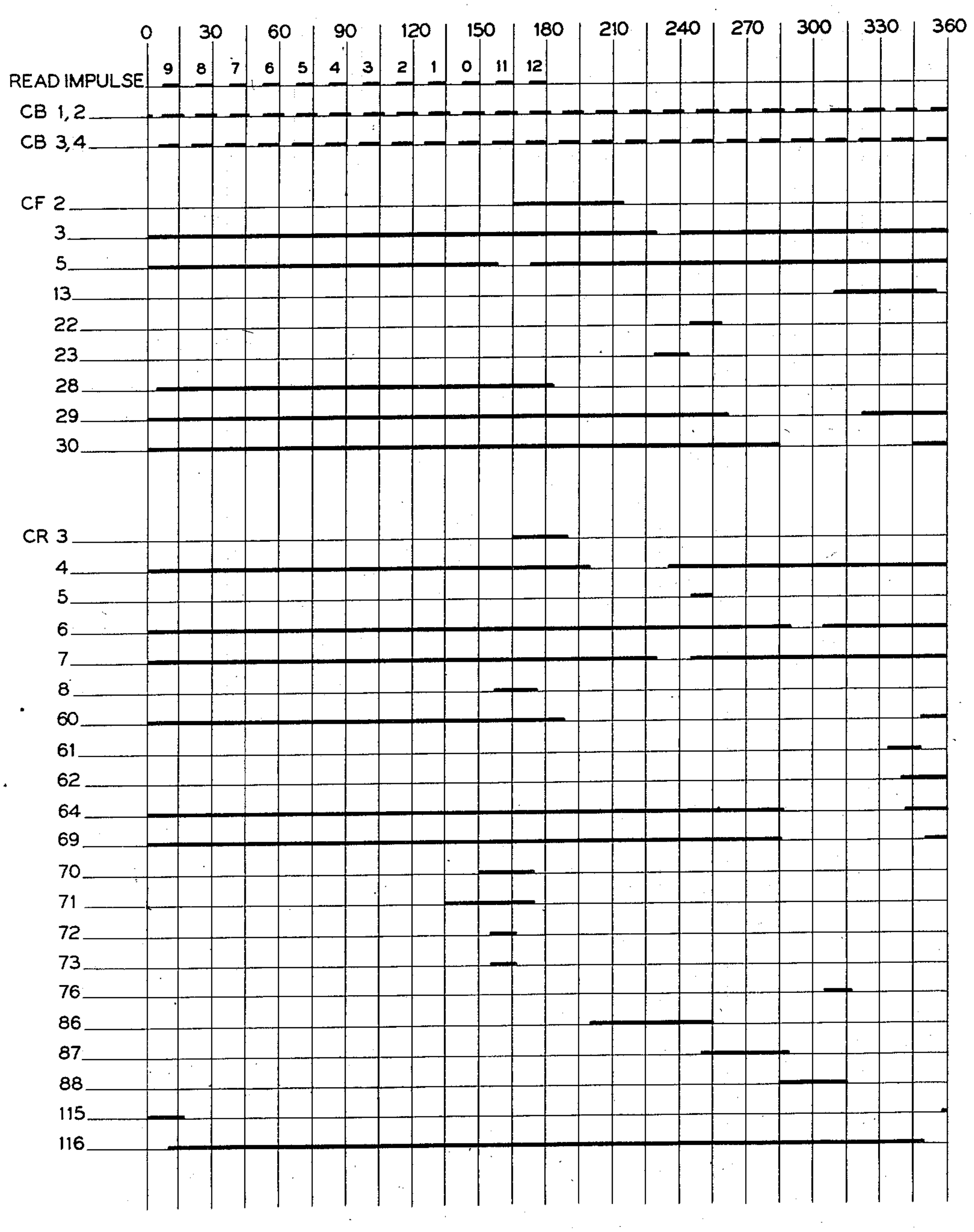

Figs. 2 and 3 are timing diagrams.

Fig. 4 shows part of a record perforated according to the 12 hole code to represent the digits 1–9 and zones 0, 11 and 12.

Fig. 5 is a view in side elevation of an assembled accumulator unit of a construction shown in detail in Patent No. 2,328,653.

The present improved system for effecting item entries is applicable to record controlled machines having cards perforated according to a combinational hole system.

It has been shown as a matter of illustration as applied to a machine of the type in which index point positions are perforated in the card columns and in which the cards are adapted to be analyzed while at rest. The particular type of machine does not enter into the present invention, as any other type of machine in which holes are analyzed would serve for the purpose of explanation and embodiment equally as well. Reference may be had to the patent to E. J. Rabenda, No. 2,569,829, for a machine of the type to which the present invention is particularly adaptable.

Referring to the wiring diagram (Fig. 1*a*), the initiation of card feeding in the machine is effected by depression of the start key which closes contacts 274 to close a circuit from the line 920, wire 272, start key contacts 274, the pickup coil of the start relay R1636 to line 921. R1636 is the start key relay and initiates the successive pickup and holding of relays R1638 and R1639 for controlling the operation of picker clutch magnet 64 which when energized causes the engagement of a picker clutch for advancing the cards from the usual supply magazine.

The machine is driven by a motor M which is placed in continuous operation by closing the power supply switch S. When relay R1639 is energized, a circuit is completed from line 920, R1639*b* relay contacts now closed, CR87 cam contacts, the picker clutch magnet 64 and line 921.

As the cards subsequently pass from the supply magazine, card lever contacts 276 are closed. Also, a circuit is completed during the first machine cycle which extends from line 920, R1639*b* relay contacts now closed, R1630*c* contacts, CR88 cam contacts, a clutch magnet 280 and line 921. Energization of this magnet will cause the engagement of a conventional one-revolution clutch to initiate rotation of a shaft for operating various cam controlled contacts. These contacts are designated with the prefix CF and are in operation when the card feeding mechanism functions. Other cam contacts prefixed CR are constantly in operation.

After the card lever contacts 276 close, CR8 cam contacts close to complete an obvious circuit to the R1628P relay coil. R1628*a* relay contacts then close to complete a holding circuit back to line 920 through the CF5 cam contacts. CF5 cam contacts extend the energization of the relay over and through the next or second card feed cycle. When R1628*c* relay contacts close during the second machine cycle and cam contacts CF2 close during this and succeeding machine cycles, a circuit is completed to energize clutch magnet 280.

Energization of the R1628 relay closes R1628*d* contacts which complete a circuit from line 920, cam contacts CR3, R1628*d* relay contacts, a gripper clutch magnet 153 and line 921. This clutch magnet causes the operation of a mechanism for closing gripping devices which serve to feed the cards past a pair of successive reading stations and on to a stacker station.

A relay R1630 is energized at the end of the first feed cycle through cam contacts CF22 and the R1630*c* relay contacts cooperate with the R1628*c* relay contacts to provide alternate circuits to the clutch magnet 280 to keep the machine running until the stop key is depressed or a card fails to feed to the card lever contacts 276.

*Card analyzing or reading circuits*

The circuits whereby the perforated cards may be analyzed at the first reading station and the second reading station are shown in Fig. 1*a* wherein it will be seen that for columns 1, 2, and 80 the arrangement of the sensing commutator is shown diagrammatically. Of course, this arrangement is duplicated for the 80 columns in each of the reading stations. The sensing circuit for the first reading station is from the line side 920, circuit breaker contacts CB1—CB4, CF28 cam contacts, first reading relay R1630*b* contacts which are closed during the analyzing time, thence to a wire 990. The wire 990 has a respective wire connection 991 to the brush 165 of the first column commutator. The brush readout 165 makes successive contact with the contact points 164 and the circuit will be closed through the particular brush 162 which passes through the card perforation. Each plate 161 which carries the series of analyzing brushes 162 has a wire connection to a respective plug socket such as socket 923 in the first column. For the first reading station there is a series of eighty plug sockets including 923, 942, etc., from which plug connections are made for control purposes.

The sensing circuit for the second reading station extends from the CF28 cam contacts, thence through the second reading R1632*g* relay contacts, which are closed by virtue of cam contacts CF23 completing a circuit to the pickup coil of relay R1632 during the second analyzing time, and to a wire 992. The wire 992 has one first wire 993 of multiple wire connections to the brush readout 165 representative of a series of sensing commutators for the second reading station. There is, likewise, a series of eighty plug sockets including sockets 926, 944 and 975 for the second reading station from which plug connections are made to the desired controls.

*The accumulators*

It is preferred to utilize the type of accumulator unit fully shown and described in the Patent No. 2,328,653, issued to C. D. Lake, et al., granted September 7, 1943, and therefore only a brief reference is necessary herein. In Fig. 5 some of the major elements of the units are shown identified by the same reference numerals as in the patent.

The pivoted armature 45 is between the cores of the advance magnet AM and the stop magnet SM and said armature has a connection to a clutch lever 21. In the declutching position of the clutch lever 21, shown in Fig. 5, the armature 45 is biased against the core of the SM magnet. Whenever the AM magnet is energized, the armature 45 will take an alternative position, rocking the clutch lever 21 to a clutching position. The clutching lever 21 is held in either clutching or declutching position by a latch 35.

Clutch lever 21 is shown in declutching position and when moved to an unclutching position it releases a disc 20 for counterclockwise movement, and a spring 31 is now effective to rock a clutch pawl 30 into engagement with a ratchet wheel 16. The latter is fixed to a constantly rotating gear 17 and therefore the ratchet wheel 16 constantly rotates. As a result of this clutching operation an accumulator element 24 is initiated in rotation. The termination of the rotation of the accumulator element is effected as a result of the energization of the SM or stop magnet. This will attract the armature 45, rocking the clutch lever 21 to declutching position.

*Direct entry into an accumulator*

The direct entry style of operation is that of reading the numbers punched in the card directly into an accumulator without listing the numbers.

The second reading station (Fig. 1*a*) is available to read the record card and the sensing devices are provided with plug sockets to carry the impulses to the accumulator entry sockets.

The accumulator must be signaled to add the amount being read. Therefore it is necessary to connect by plug wire from the card feed cycles plug socket 977 (Fig. 1*a*) to the accumulator control plus entry socket 978 (Fig. 1*c*). The card feed cycles relay points R1641*a* are closed when relay R1641 (Fig. 1*a*) is energized during starting and sensing operations through CR88. A plug wire is also connected from socket 977 (Fig. 1*a*) to carry the card cycles impulse to the accumulator control plug socket 979 (Fig. 1*c*) which is titled "Direct Entry or Direct Reset."

In the case of normal operation of the accumulator wherein any of the digits 1–9 are entered, the plus control circuit includes line 920 (Fig. 1*a*), wire 1038, cam contacts CF29 and CF30, card cycles relay contact R1641*a*, plug socket 977 and a plug wire to socket 978 (Fig. 1*c*), relay R371, wire 1029 to line 921. A parallel circuit is completed by plug wire from socket 977 (Fig. 1*a*) to plug socket 979 (Fig. 1*c*) and the card cycles impulse is directed through the normally closed side of zone switch relay contacts RLW2*i* into the direct entry control relay R149 and then carried by wire 1029 to the line 921. These two relays R149 and R371 serve to effect connections making direct entry possible.

The normally open plus relay contacts R371*e* at the lower right-hand corner of Fig. 1*c* are closed to complete the accumulator circuit to add any impulse read from the card at the second reading station. In series therewith are the direct entry relay contacts R149*f* controlled by the direct entry relay for the purpose of carrying the card reading impulse directly to the accumulator magnet AM.

Relay R371 also controls contacts for preventing the operation of the list control relay R223 (Fig. 1c) during digits 1–9 reading time and it does this by shifting contacts R371a. The circuit for the list control relay, which includes line 920 (Fig. 1c), cam contacts CR71, transferred relay contacts R1491, open relay contacts R371a, normally closed side of readout relay contacts R445a, normally closed side of zone switch relay contacts RLW3a, list control relay R223 and wire 1029 to line 921, will remain open until cam contacts CR71 close at 135° to complete the circuit through the shifted R371a contacts.

At the bottom of Fig. 1c, it is seen that, in series with the adding magnet AM, are the normally closed list control contacts R223e, the normally open direct entry contacts R149f and the normally open plus contacts R371e and now all these points are closed to complete a circuit to add into the accumulator directly from the card at the second reading station as follows: From the line 920 (Fig. 1a), through the CB contacts, card control relay contacts R1632g, wire 992 to a particular sensing device at the second station including brush structure 165, commutator contacts 164 and sensing brush 162 to a common conductor 161 in series with plug socket 975 and a plug wire to socket 976 (Fig. 1c), then through the normally closed readout relay contacts R445f, the normally closed list control relay contacts R223e, the normally open direct relay contacts R149f, the normally open plus relay contacts R371e, the adding magnet AM and line 921.

The circuit breaker contacts CB direct impulses through any perforations sensed in the card and these, in turn, start the accumulator wheels rotating until they are stopped under control of a stop relay RLW8 at 0 reading time (150°) for normal digit entries. For normal digit entry operation the stop relay RLW8 is energized by the following circuit: Line 920 (Fig. 1b), cam contacts CRLW1 which close from 135° to 150° in the machine cycle, normally closed relay contacts RLW3j, the normally closed readout relay contacts R445k, relay contacts RLW7a which will be transferred from 348° to 188°, the stop relay RLW8, and wire 2000 to line 921. The relay contacts RLW7a were transferred by a circuit from line 920, wire 2001, cam contacts CR60, the relay RLW7 and line 921. The stop impulse, then, is carried from the CB contacts (Fig. 1a) to the now closed relay contacts RLW8a—RLW8c, the stop magnets SM and line 921. The accumulator is thereby adapted to register the numeral value equal to the value of the digit perforations in the card.

All accumulator orders in the normal condition are actually standing at the position "9." Therefore, when the accumulator receives an impulse, it will latch up the 10's carry contact 240 as it passes from the 9 position to the 0 position. Assuming that a 5 is to be added, the accumulator will latch the 10's contact 240 and turn through 0, 1, 2, 3 and stop at 4. A carry impulse will then be sent through the 10's contact, advancing the accumulator one more unit of rotation, thus changing the accumulated 4 to the proper 5 and all other accumulator positions are advanced from 9 to 0.

The carry control relay R638 (Fig. 1b) is energized by the closure of cam contacts CR61 at 295° to 315° in time to complete the usual circuits from the 9 and 10's accumulator contacts 241 and 240 (Fig. 1c) to direct impulses into the accumulator adding magnets AM. The contacts R638d of the carry control relay are seen to be in a series connection between the adding magnet AM and a carry control plug socket 981. The carry impulse is conducted by plug wire from the 9's contact of the highest order of the accumulator and transmitted to the adding magnet of the lowest order of the related accumulator group. This connection is established by plug wire between the CI plug socket 980 and the C socket 981 of the lowest order. A more detailed account of the conventional carry circuits may be referenced from the previously mentioned Patent No. 2,569,829.

The description, thus far, has described the well-known operation of the machine for the entry of the basic digits 1–9. The manner by which the accumulator may be selectively operated to receive the zone representations will now be described.

Whenever it is desired to store the zone representations in the accumulator, a zone control switch SW (Fig. 1b) is turned to the "on" position to complete a circuit from line 920, wire 2001, wire 2002, the zone control switch SW, wire 2003, the pickup coils of switching relays RLW2, RLW3 and line 921. Referring to Fig. 1c, various contacts of these switching relays are included in the entry circuits to the accumulator and these contacts in effect switch the operation of the accumulator so that the accumulator will now read in and read out only during zone time. Referring to the timing chart in Fig. 2, it may be seen that zone time or the time in the cycle during which the 0, 11 and 12 perforations are sensed extends from approximately 140° to 180°.

For zone operation, only the Direct Entry Socket 979 (Fig. 1c) is plug wired to the card feed cycles plug socket 977 (Fig. 1a) and the card cycles impulse is directed to the pickup coil of plus relay R731 (Fig. 1c) through the transferred switch relay contacts RLW2i. This impulse will maintain relay R371 energized from 322° to 285° through the cam contacts CF29 and CF30. The direct entry relay R149 is now energized from 342° to 285° through a circuit which extends from line 920, cam contacts CR64, the normally closed side of readout relay contacts R445j, the closed switch relay contacts RLW2e, relay R149 and line 921.

The list control relay R223 will be energized at 358° through a circuit which extends from line 920, cam contacts CR115, the normally closed readout relay contacts R4451, the transferred plus relay contacts R371h, transferred switch relay contacts RLW3a, list control relay R223 and line 921. Relay R223 will hold until 135° by a circuit which extends from line 920, cam contacts CR64, cam contacts CFLW4, wire 2004, the transferred switch relay contacts RLW3e, the closed contacts R223a, the hold coil of relay R223 and line 921.

From the circuits just traced an analysis of the accumulator entry circuits will show that no entry into the accumulator can be made from 9 through 1 time (7°–135°) because the list control relay contacts R223b, R223c and R223e are open. When relay R223 is de-energized at 135°, a circuit can be completed from the second reading station at 0, 11 and 12 time, through the normally closed side of readout relay contacts R445f, normally closed list control relay contacts R223e, transferred direct entry relay contacts R149f, the transferred plus relay contacts R371e, the start magnet AM and line 921. Now it can be understood that by merely adjusting the zone control switch and changing the plug connection to the plus socket 978, the accumulator may be conditioned to accept either the digits 1–9 or the zones, 0, 11 and 12.

In the case of zone operation it becomes necessary to provide a differently timed stop circuit to the stop magnets of the accumulator. For zone operation, the stop relay RLW8 (Fig. 1b) is energized from 255° to 270° instead of from 135° to 150°, as in the case of normal operation, by a circuit which extends from line 920, cam contacts CFLW3, closed switch relay contacts RLW3i, normally closed side of switch relay contacts RLW7a, stop relay RLW8, wire 2000 and line 921. A stop impulse from 262° to 270° is then provided for the stop magnets of the accumulator by a circuit which extends from line 920 (Fig. 1a), circuit breaker contacts 1, 2, 3 and 4, wire 2005, the closed stop relay contacts RLW8a, RLW8b and RLW8c, the stop magnets SM and line 921.

The entry of a 0 into the accumulator at 142° will result in the accumulator operating between 142° and 262°. In addition, the carry impulse previously described in connection with digit operation, will also be transmitted to the add magnet and as a result the accumulator will advance 9 units and, since the accumulator orders are normally standing at the position "9," the accumulator will advance to the position "8" at which point it is stopped and the 0 reading is stored as an 8. Similarly, the 11 reading is stored as a 7 and the 12 reading as a 6.

*Accumulator readout of zone storage*

It is not believed necessary to describe herein the method of readout for normal digit operation since this is discussed in detail in the Rabenda Patent No. 2,569,829, and is well known in the art.

When using the accumulator for zone storage, it is possible to read out of the accumulator after direct entry of the zone representations has been made from the card by plug wiring from the card feed cycles impulse socket 977 (Fig. 1*a*) to socket 986*a* (Fig. 1*c*) to energize the hold coil of readout relay R445. With the zone control switch (Fig. 1*b*) closed to energize the switch relays RLW2 and RLW3 for zone operation, the list control relay R223 is now energized by a circuit which includes line 920 (Fig. 1*c*), cam contacts CR64, cam contacts CFLW4, transferred readout relay contacts R445*j*, normally closed side of plus relay contacts R371*h*, the transferred switch relay contacts RLW3*a*, list relay R223, wire 1029 to line 921. As a result, the list control relay R223 will be energized from 342° to 135° and from 180° to 287° leaving the list control relay contacts R223*b*, R223*c* and R223*e* (Fig. 1*c*) in their normal position to effect readout only during zone time (142°–180°).

In similar fashion, the direct entry relay R149 will be energized from a circuit which extends from line 920, cam contacts CR64, cam contacts CFLW4, transferred readout relay contacts R445*j*, the closed switch relay contacts RLW2*e*, the pickup coil of direct entry relay R149, wire 1029 and line 921.

With relays R149 and R445 energized, the inversion relay R75 (Fig. 1*b*), which is used to invert the readout of information in the accumulator, is now energized by a circuit which extends from line 920 (Fig. 1*c*), cam contacts CR64, wire 2007 (Fig. 1*b*), closed direct entry contacts R149*b*, closed readout relay contacts R445*b*, the hold coil of inversion relay R75, wire 2000 and line 921. The inversion relay R75 will hold from 351° to 286° by a circuit which extends from line 920 (Fig. 1*b*), cam contacts CR59, the closed inversion relay contacts R75*a*, the hold coil of relay R75, wire 2000 to line 921.

Referring to Fig. 1*b*, a pair of switch relays RLW6 and RLW4 are energized to control the readout and reset operations of the accumulator. The circuit for switch relay RLW6 extends from line 920, wire 2001, cam contacts CR60, the pickup coil of switch relay RLW6 and line 921. Relay RLW6 will hold through the cam contacts CR60 until 188° of the readout cycle. The circuit for switch relay RLW4 extends from line 920, wire 2001, wire 2002, cam contacts CF13, the closed switch relay contacts RLW2*c* (always closed during zone operation), the pickup coil of switch relay RLW4 and line 921. Relay RLW4 will hold until 287° of the readout cycle by a circuit which extends from line 920, wire 2001, wire 2002, cam contacts CRLW64, the closed switch relay contacts RLW4*a*, the hold coil of switch relay RLW4 and line 921.

The readout circuits are now conditioned to read out of the accumulator during zone time (142°–180°) only. To read out a 0, which it will be remembered has been stored in the accumulator as an 8, the circuit would extend from line 920 (Fig. 1*a*), the CB contacts, wire 1043 carrying an impulse at 0 time (142°–150°) through the total print emitter (Fig. 1*b*) comprising the brush structure 1039, the contact point in the 0 position and wire 2008, and then through the now transferred switch relay contacts RLW6*c*, the now closed switch relay contacts RLW4*d*, the transferred inversion relay contacts R75*k* (Fig. 1*c*), the accumulator contact 2009 in the 8 position, and then through the commutator brush structure 1044 to the common contact strip 1045, the transferred readout relay contacts R445*f*, the normally closed side of list control relay contacts R223*e*, the normally closed side of the direct entry relay contacts R149*f* and the accumulator exit socket 984.

The accumulator exit socket 984 may be plug wired to carry out a total printing operation in the well-known manner described in the Rabenda Patent No. 2,569,829.

*Accumulator zone storage readout with reset of the accumulator*

To read out and reset an accumulator being used for zone storage, the "Readout and Reset Socket" 986 (Fig. 1*c*) is plug wired to the socket 977 (Fig. 1*a*) to energize the pickup coils of readout relay R445 and reset relay 519 from 322° to 285°.

The direct entry relay R149 is energized from 342° to 135° and 180° to 287° by a circuit which extends from line 920 (Fig. 1*c*), cam contacts CR64, cam contacts CFLW4, the transferred readout relay contacts R445*j*, the closed switch relay contacts RLW2*e*, the pickup coil of relay R149, wire 1029 and line 921.

Also, the plus relay R371 is now energized by a circuit which extends from line 920 (Fig. 1*c*), cam contacts CR64, wire 2007 (Fig. 1*b*), closed direct entry relay contacts R149*b*, closed readout relay contacts R445*b*, closed reset relay contacts R519*a*, the hold coil of plus relay R371 to line 921.

With the relays R445, R149 and R371 energized, the readout circuit for the accumulator will be identical to the one previously described for read out of the accumulator without reset.

Assuming as before, that the accumulator has stored in it an 8 to represent the zone entry of 0, a 1 must be added to the accumulator to reset it to the 9 position. To accomplish this the cam contacts CFLW7 (Fig. 1*b*) have been provided in reset circuit of the accumulator to provide a suitably timed reset pulse. The reset circuit will extend from line 920 (Fig. 1*a*), circuit breakers CB, wire 1043, to the total print emitter (Fig. 1*b*), wire 2010, cam contacts CFLW7 closed from 245° to 257°, the normally closed side of switch relay contacts RLW6*c*, the transferred switch relay contacts RLW4*d*, the transferred inversion relay contacts R75*k* (Fig. 1*c*), the accumulator contact in the 8 position, and then through the commutator brush structure 1044 to the common contact strip 1045, the transferred readout relay contacts R445*f*, the normally closed list control relay contacts R223*e*, transferred direct entry contacts R149*f*, the transferred plus relay contacts R371*e*, the start magnet AM and line 921.

The stop circuit previously described will be completed from 262° to 270° through the stop relay contacts RLW8*c* to the stop magnet SM and line 921 and consequently, the accumulator will move 1 unit to 9 position.

In similar fashion, accumulators storing a 7 or a 6 for zone entries of 11 or 12 will reset to the 9 position through the cam contacts CFLW5 and CFLW6.

It will be noted that the reset relay contacts R519*d* (Fig. 1*c*) will attempt to complete a late start impulse (155°–167°) from cam contacts CR73 (Fig. 1*b*) and wire 1033 to the accumulator start magnet. However, the minus control relay R297 (Fig. 1*c*) has not been energized and the minus control relay contacts R297*b*, R297*c* and R297*e* will prevent this impulse from reaching the start magnets.

*Zone storage accumulator inactive*

On any cycle in which an accumulator conditioned for zone storage is not plug wired for actual operation, the list control relay R223 will be energized by a circuit from line 920 (Fig. 1*c*), cam contacts CR64, the normally closed side of readout relay contacts R445*j*, normally closed side of the plus relay contacts R371*h*, the transferred switch relay contacts RLW3*a*, the pickup coil of relay R223, wire 1029 and line 921. Relay R223 will hold from 342° to 287°. Also, the direct entry relay R149 will be energized from 342° to 287° by a circuit which extends from line 920, cam contacts CR64, the normally closed side of readout relay contacts R445*j*, the closed switch relay contacts RLW2*e*, the pickup coil of relay R149, wire 1029 and line 921. An analysis of the accumulator entry and exit circuits will show that contacts of relays 149 and 223 will disconnect the entry sockets 976 and exit sockets 984 from the accumulator during an inactive cycle.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine controlled by a card having a first group of control designations and a second group of control designations arranged in a single series of index point positions, means for sensing said index point positions, a storage unit normally adapted to receive and store control designations from said first group only, entry means under control of said sensing means and operable during different periods to initiate an entry into said storage unit corresponding to a control designation sensed from said first group, or a control designation sensed from said second group, means for selecting the period of operation of said entry means, and means under control of said selecting means for controlling said storage unit to store either an entry made from said first group of control designations, or an entry made from said second group of control designations.

2. In a machine controlled by a card having a first group of control designations and a second group of control designations arranged in a single series of index point positions, means for sensing said index point positions, an accumulator unit of the type wherein the entry in an accumulator element is initiated by an impulse transmitted to a start magnet, and is terminated by an impulse transmitted to a stop magnet, entry means under control of said sensing means and operable during different periods to transmit an impulse to said start magnet to initiate a digit entry corresponding to a control designation sensed from said first group, or an entry corresponding to a control designation sensed from said second group, means for selecting the period of operation of said entry means, and cyclically operable impulse transmitting means under control of said selecting means for transmitting differently timed impulses to said stop magnet to terminate either an entry from said first group of control designations or an entry from said second group of control designations.

3. In a machine controlled by a card having holes arranged at index point positions according to a 12 hole code, representing digit entries 1–9 of the decimal system and zone entries 0, 11 and 12, means for sensing said index point positions to ascertain the presence of digit representing holes and zone representing holes, an accumulator unit of the type wherein the entry in an accumulator element is initiated by an impulse transmitted to a start magnet, and is terminated by an impulse transmitted to a stop magnet, entry means under control of said sensing means and operable during different periods to transmit an impulse to said start magnet to initiate a digit entry corresponding to the digit representing hole sensed, or a zone entry corresponding to a zone representing hole sensed, means for selecting the period of operation of said entry means, and cyclically operable impulse transmitting means under control of said selecting means for transmitting differently timed impulses to said stop magnet to terminate either a 1–9 digit entry or a 0, 11 or 12 zone entry.

4. A machine as in claim 3 wherein said cyclically operable impulse transmitting means transmits a timed impulse to said stop magnet to enable a zone entry of 0, 11 or 12 to be stored in the accumulator as an 8, 7 or 6 respectively.

5. A machine as in claim 4 wherein said accumulator includes digit entry readout means and switching means included in said readout means and operated by said selecting means to control said readout means to effect readout of the stored value corresponding to the zone entry.

6. In a machine controlled by a card having holes arranged at index point positions according to a 12 hole code, representing digit entries 1–9 of the decimal system and zone entries 0, 11 and 12, means for sensing said index point positions to ascertain the presence of digit representing holes and zone representing holes, an accumulator unit of the type wherein the entry in an accumulator element is initiated by an impulse transmitted to a start magnet, and is terminated by an impulse transmitted to a stop magnet, entry means under control of said sensing means to transmit an impulse to said start magnet to initiate a digit entry corresponding to the digit representing hole sensed, switching means included in said entry means for conditioning the entry means to transmit an impulse to said start magnet to initiate a zone entry corresponding to the zone representing hole sensed, means for selectively controlling said switching means to cause said entry means to operate for either digit entry or zone entry, and cyclically operable impulse transmitting means under control of said switching means for transmitting an impulse to said stop magnet to terminate a digit entry or to transmit a differently timed impulse to said stop magnet to terminate a zone entry.

References Cited in the file of this patent

UNITED STATES PATENTS 2,475,312 Daly ------------------ July 5, 1949